US012741565B2

(12) United States Patent
Ono

(10) Patent No.: US 12,741,565 B2
(45) Date of Patent: Sep. 22, 2026

(54) WORK VEHICLE

(71) Applicant: Kubota Corporation, Osaka (JP)

(72) Inventor: Kohei Ono, Sakai (JP)

(73) Assignee: Kubota Corporation, Osaka (JP)

( * ) Notice: Subject to any disclaimer, the term of this patent is extended or adjusted under 35 U.S.C. 154(b) by 304 days.

(21) Appl. No.: 18/539,994

(22) Filed: Dec. 14, 2023

(65) Prior Publication Data

US 2024/0217394 A1 Jul. 4, 2024

(30) Foreign Application Priority Data

Jan. 4, 2023 (JP) ................................ 2023-000162

(51) Int. Cl.
*B60L 58/26* (2019.01)
*B60L 1/00* (2006.01)

(52) U.S. Cl.
CPC ............... *B60L 58/26* (2019.02); *B60L 1/003* (2013.01); *B60L 2200/40* (2013.01)

(58) Field of Classification Search
CPC ...... B60L 58/26; B60L 1/003; B60L 2200/40; B60L 50/60; B66C 23/78
See application file for complete search history.

(56) References Cited

U.S. PATENT DOCUMENTS

| | | | |
|---|---|---|---|
| 11,065,974 | B2 * | 7/2021 | Kodera |
| 11,142,887 | B2 * | 10/2021 | Watanabe |
| 11,668,074 | B2 * | 6/2023 | Ogawa |
| 2019/0315243 | A1 | 10/2019 | Kodera et al. |
| 2020/0208657 | A1 | 7/2020 | Uemura et al. |
| 2021/0062467 | A1 | 3/2021 | Watanabe et al. |
| 2022/0290410 | A1 | 9/2022 | Ogawa et al. |

FOREIGN PATENT DOCUMENTS

| | | | |
|---|---|---|---|
| CN | 114374266 | A | 4/2022 |
| CN | 114714931 | A | 7/2022 |
| JP | 201115544 | A | 1/2011 |
| JP | 2013141875 | A | 7/2013 |
| JP | 2020108213 | A | 7/2020 |
| JP | 2021147859 | A | 9/2021 |

* cited by examiner

*Primary Examiner* — James A Shriver, II
*Assistant Examiner* — Nicholas R. Kandas
(74) *Attorney, Agent, or Firm* — The Webb Law Firm

(57) ABSTRACT

A work vehicle including an electric actuator; a battery configured to supply drive power to the electric actuator; a charging section via which the battery is chargeable from a power source external to a vehicle body; and a discharge operation apparatus configured to cause the battery to discharge during charging of the battery.

7 Claims, 4 Drawing Sheets

12
13
21
23
20
22
14
22a
25,26
10
24
2
6
9
6a
11
17
18
3
7
16
5a
19
8a
B
U
D
F
15
8
32
5b
1
5
4

POWER SOURCE
33
34
CONTROL APPARATUS
39
DISCHARGE CONTROL SECTION
37
40
32
BATTERY TEMPERATURE SETTING SECTION
44
COOLING CONTROL SECTION
57
INVERTER TEMPERATURE SETTING SECTION
59
35
24
43
a
n
b
28
42
27
36
36a
26
15
41
16
58
BATTERY
INVERTER
ELECTRIC MOTOR
29
29a
30
25
61
48
46
51
COOLING WATER COOLER
38a
38
67
63
56a
69
62
64
68
70
31
49
ELECTRIC COOLING MOTOR
56
60
47
45
50
55
66

DISCHARGE CONTROL
CHARGING
No
Yes
INPUT DETECTED BATTERY TEMPERATURE "KB"
INPUT SET BATTERY TEMPERATURE "SB"
[KB]<[SB]
No
Yes
OPERATING VALVE (28) IN NEUTRAL POSITION "n"?
No
Yes
SWITCH DISCHARGE SWITCH (36a) TO "ON"
SWITCH DISCHARGE SWITCH (36a) TO "OFF"
RETURN

COOLING CONTROL
INPUT DETECTED INVERTOR TEMPERATURE "KI"
INPUT SET INVERTOR TEMPERATURE "SI"
[KI] ≧ [SI]
No
Yes
SWITCH COOLING SWITCH (56a) TO "ON"
SWITCH COOLING SWITCH (56a) TO "OFF"
RETURN

WORK VEHICLE

CROSS REFERENCE TO RELATED APPLICATION

This application claims priority to Japanese Patent Application No. 2023-000162, filed Jan. 4, 2023, the disclosure of which is hereby incorporated by reference in its entirety.

BACKGROUND OF THE INVENTION

1. Field of the Invention

The present invention relates to a work vehicle.

2. Description of Related Art

For example, as shown in JP 2013-141875A, there are work vehicles (electric tractors) equipped with an electric actuator (travel motor, work motor), and a battery (battery, auxiliary battery) that supplies drive power to the electric actuator.

With a work vehicle such as the above, inefficient battery output caused by the slow chemical reaction of the battery when the battery gets cold in cold regions and the like, compared to when the temperature of the battery is high, prevents the work vehicle from performing work efficiently due to the reduced output of the electric actuator which is driven by power from the battery.

SUMMARY OF THE INVENTION

The invention provides a work vehicle that is able to perform work, using power efficiently output by a battery, even if the battery is cold before starting work.

A work vehicle according to the invention comprising:

an electric actuator;

a battery configured to supply drive power to the electric actuator;

a charging section via which the battery is chargeable from a power source external to a vehicle body; and a discharge operation apparatus configured to cause the battery to discharge during charging of the battery.

According to this configuration, when the battery is being charged before starting work, the battery can be discharged by the discharge operation apparatus to heat the battery due to the discharging, and thus, even if the battery is cold before starting work, at the time of performing work, the battery is warmer than before starting work and the work vehicle is able to use power efficiently output by the battery.

The above configuration preferably further includes a hydraulic pump connected to a hydraulic actuator via an operating oil path and configured to supply hydraulic oil to the hydraulic actuator, an operating valve provided in the operating oil path and configured to control the hydraulic actuator, a relief oil path connected to a portion of the operating oil channel upstream of the operating valve, and an electric motor configured to drive the hydraulic pump, and the discharge operation apparatus preferably causes the battery to discharge by connecting the battery to the electric motor such that power is supplied to the electric motor from the battery.

According to this configuration, the electric motor is driven by power discharged by the battery that is caused to discharge by the discharge operation apparatus, and the hydraulic pump is driven by the electric motor to supply hydraulic oil to the operating oil path. When the battery is being charged, the operating valve is in the neutral position, and hydraulic oil supplied to the operating oil channel flows into the relief oil channel and returns to the tank through the relief oil channel. The hydraulic oil then increases in temperature and decreases in viscosity, allowing the hydraulic oil to flow more easily. In other words, at the time of performing work, the hydraulic oil flows more easily toward the hydraulic actuator compared to before charging the battery, and operation of the hydraulic actuator is facilitated.

The above configuration preferably further includes a charging detection mechanism configured to detect charging of the battery, and the discharge operation apparatus preferably includes a discharge control section configured to cause the battery to discharge during charging, based on detection information of the charging detection mechanism.

According to this configuration, as long as the operation for charging the battery is performed, the battery is charged, the discharge control section controls the discharge operation apparatus based on detection information of the charging detection mechanism, and the battery is caused to discharge by the discharge operation apparatus, thus enabling the temperature of the battery to be easily increased without the extra time and effort involved in discharging the battery.

The above configuration preferably further includes a battery temperature detection mechanism configured to detect a temperature of the battery, and the discharge control section preferably causes the battery to discharge during charging, in response to a battery temperature detected by the battery temperature detection mechanism being lower than a set battery temperature, and does not cause the battery to discharge during charging, in response to the detected battery temperature being higher than or equal to the set battery temperature.

According to this configuration, when the battery discharges and warms up, and the battery temperature detected by the battery temperature detection mechanism increases to higher than or equal to the set battery temperature, the discharge control section operates the battery to a non-discharge state and the battery stops discharging, thus enabling the battery to be prevented from overheating due to the discharging, by appropriately setting the set battery temperature.

The above configuration preferably further includes a power device connected to the battery, a cooling apparatus configured to cool the power device, a device temperature detection mechanism configured to detect a temperature of the power device, and a cooling control apparatus configured to control operation of the cooling apparatus based on detection information of the device temperature detection mechanism, and the cooling control apparatus preferably controls the cooling apparatus to operate, in response to a device temperature detected by the device temperature detection mechanism being higher than or equal to a set device temperature, and controls the cooling apparatus to stop operation, in response to the detected device temperature being lower than the set device temperature.

According to this configuration, the cooling control apparatus operates the cooling apparatus based on the device temperature detected by the device temperature detection mechanism and the set device temperature, and the power device is cooled while ensuring that the temperature of the power device does not rise to higher than or equal to the set device temperature or fall to lower than the set device temperature, thus enabling failure or performance degradation due to a rise or fall in the temperature of the power device to be prevented.

In the above configuration, preferably the power device is an inverter.

According to this configuration, failure or performance degradation due to a rise or fall in the temperature of the inverter can be prevented.

The above configuration preferably further includes an electric device connected to the battery, and a device cooling apparatus configured to cool the electric device.

According to this configuration, the electric device can be cooled by the device cooling apparatus, thus enabling failure due to an increase in temperature of the electric device to be avoided by preventing an abnormal increase in temperature caused by driving the electric device, for example.

The above configuration preferably further includes a battery cooling apparatus configured to cool the battery.

According to this configuration, the battery can be cooled by the battery cooling apparatus, thus enabling an abnormal increase in temperature caused by discharging the battery, for example, to be avoided.

BRIEF DESCRIPTION OF THE DRAWINGS

The terms FIG., FIGS., FIGURE, and FIGURES are used interchangeably in the specification to refer to the corresponding figures in the drawings.

DESCRIPTION OF THE INVENTION

Hereinafter, an embodiment serving as an example of the invention will be described based on the drawings.

Figure 1:
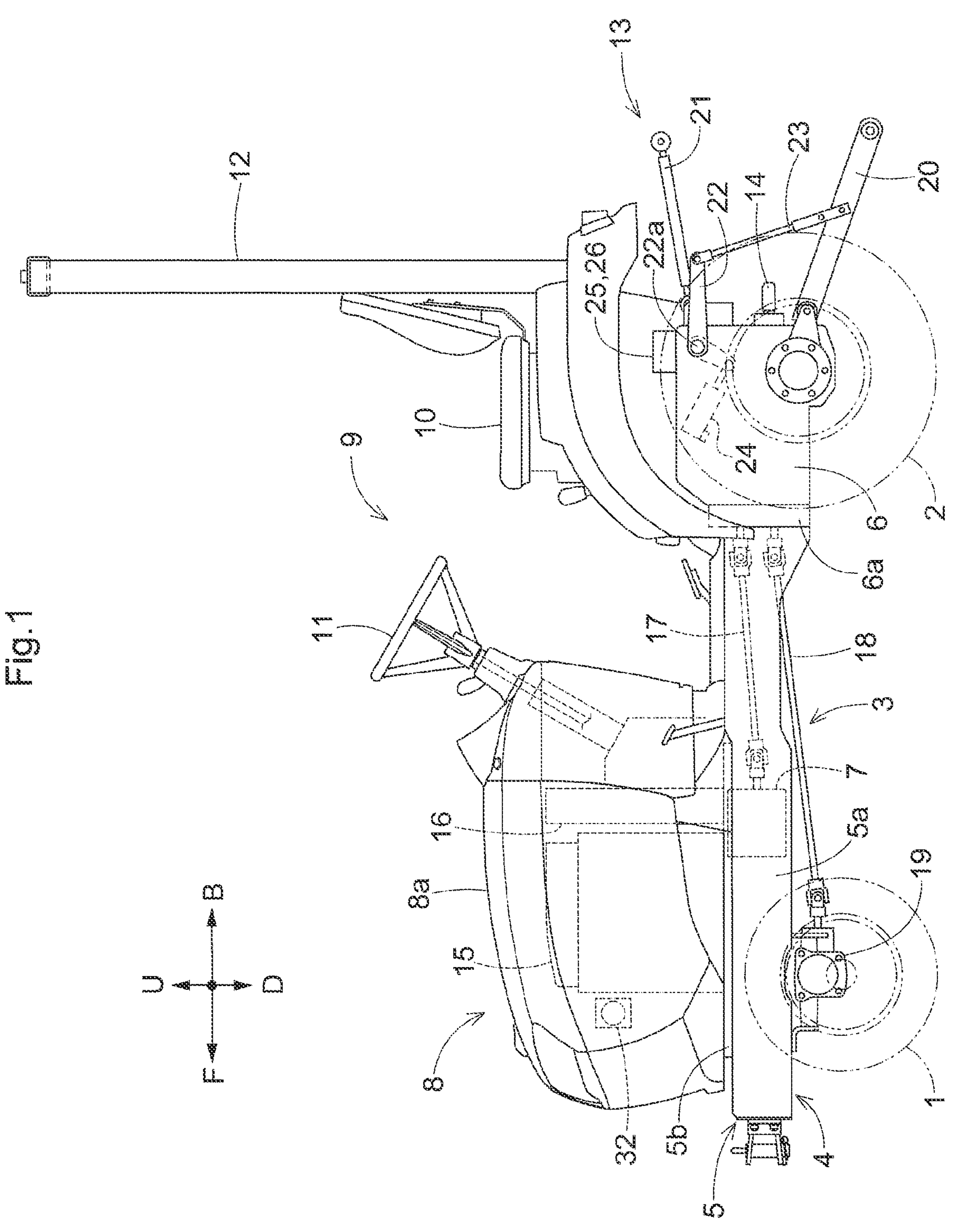
FIG. 1 is a side view of an electric tractor.

Note that, in the following description, the direction of the arrow F shown in FIG. 1 is "the body front side", the direction of the arrow B shown in FIG. 1 is "the body back side", the direction of the arrow U shown in FIG. 1 is "the body up side", the direction of the arrow D shown in FIG. 1 is "the body down side", the direction of the front side of the sheet of FIG. 1 is "body left side", and the direction of the back side of the sheet of FIG. 1 is "body right side", in relation to the travel body of an electric tractor (example of "work vehicle").

Overall Configuration of Electric Tractor

As shown in FIG. 1, the electric tractor includes a travel body 3 having a pair of left and right front wheels 1 and a pair of left and right back wheels 2. The pair of left and right front wheels 1 are steerable and drivable. The pair of left and right back wheels 2 are drivable. The travel body 3 includes a body frame 4 that is provided with a front frame 5 constituting a front portion of the body frame 4 and a transmission case 6 coupled to a back portion of the front frame 5 and constituting a back portion of the body frame 4. In the front portion of the travel body 3 is provided a motive section 8 that includes a travel electric motor 7 serving as an electric actuator that drives the front wheels 1 and the back wheels 2. In the back portion of the travel vehicle 3 is provided a driving section 9 in which an operator rides. The driving section 9 is provided with a driver's seat 10, a steering wheel 11 for steering the front wheels 1, and a ROPS 12. In a back portion of the transmission case 6 of the body frame 4 are provided a link mechanism 13 for coupling any of various work apparatuses such as a rotary tiller (not shown) in such a manner as to be raisable and lowerable, and a power takeoff shaft 14 that takes work power from inside the transmission case 6 and transmits the power to the coupled work apparatus.

Motive Section

As shown in FIG. 1, in addition to the travel electric motor 7, the motive section 8 includes a battery 15 that supplies drive power to the travel electric motor 7, and an inverter 16 that converts DC power from the battery 15 into AC power and supplies the AC power to the travel electric motor 7. The battery 15 is supported by a battery mount **5*b* provided in an upper portion of the front frame 5. The inverter 16 is disposed backward of the battery 15. The travel electric motor 7 is supported by the front frame 5 in such a manner as to be disposed between left and right side frame portions 5*a* of the front frame 5 downward of the battery 15 and the inverter 16**.

Driving of the back wheels 2 by the travel electric motor 7 is made possible, by the travel electric motor 7 being driven by power supplied from the battery 15 via the inverter 16, the output of the travel electric motor 7 being input via a rotation shaft 17 to a hydrostatic continuously variable transmission **6*a* provided in a front portion of the transmission case 6, and the output of the continuously variable transmission 6*a* being transmitted to a gear transmission (not shown) provided inside the transmission case 6 and transmitted to the back wheels 2 from the gear transmission. Driving of the front wheels 1 by the travel electric motor 7 is made possible, by the power transmitted from the continuously variable transmission 6*a* to the gear transmission being input to a front wheel drive case 19 via a rotation shaft 18 extending toward the body front side from the transmission case 6**.

Link Mechanism

As shown in FIG. 1, the link mechanism 13 is provided with a pair of left and right lower links 20 extending backward from a lower portion of the transmission case 6 in such a manner as to be swingable up and down, a top link 21 extending backward from an upper portion of the transmission case 6 in such a manner as to be swingable up and down, a pair of left and right lift arms 22 supported in such a manner as to be swingable up and down in an upper portion of the transmission case 6, a left lift rod 23 that couples the left lift arm 22 and the left lower link 20, and a right lift rod 23 that couples the right lift arm 22 and the right lower link 20.

In the link mechanism 13, the work apparatus is coupled to the transmission case 6 in such a manner as to be raisable and lowerable due to the left and right lower links 20 and the top link 21 being coupled to the work apparatus. Due to the right and left lift arms 22 being raised and lowered, the left lower link 20 is raised and lowered by the left lift arm 22 via the left lift rod 23 and the right lower link 20 is raised and lowered by the right lift arm 22 via the right lift rod 23, resulting in the work apparatus being raised and lowered with respect to the travel body.

As shown in FIG. 1, inside the transmission case 6 is provided a lift cylinder 24 serving as a hydraulic actuator coupled to a rotary support shaft **22*a* of the left and right lift arms 22, and in an upper portion of the transmission case 6 are provided a hydraulic pump 25 that supplies hydraulic oil to the lift cylinder 24 and an electric motor 26 that drives the hydraulic pump 25, enabling the link mechanism 13** to be raised and lowered.

Figure 2:
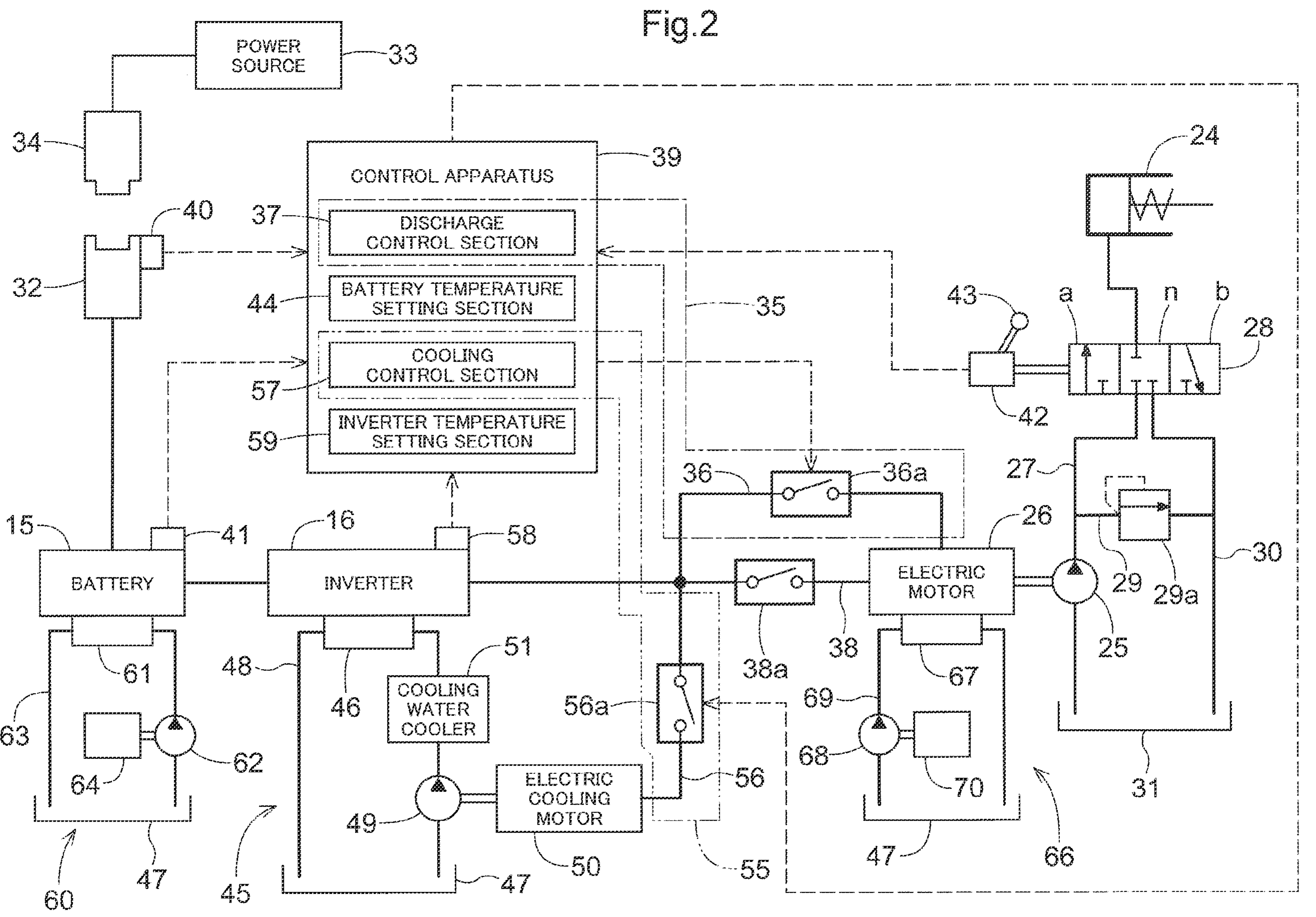
FIG. 2 is an electrical circuit diagram and a hydraulic circuit diagram.

Specifically, as shown in FIG. 2, the hydraulic pump 25 and the lift cylinder 24 are connected via an operating oil path 27, and the operation oil path 27 is provided with an operating valve 28 that controls the lift cylinder 24. The operating oil path 27 has a relief oil path 29 connected thereto upstream of the operating valve 28. The hydraulic pump 25 is driven by the electric motor 26, and hydraulic oil is taken from a hydraulic oil tank 31 and supplied to the operating oil path 27.

The operating valve 28 is switchable to a neutral position "n", a raising position "a", and a lowering position "b". When the operating valve 28 is switched to the raising position "a", the lift cylinder 24 extends due to hydraulic oil from the hydraulic pump 25 being supplied to the lift cylinder 24 via the operating valve 28, and the left and right lower links 20 are raised due to the left and right lift arms 22 being raised by the lift cylinder 24. When the operating valve 28 is switched to the lowering position "b", the lift cylinder 24 retracts under the load of the work apparatus due to hydraulic oil located in the lift cylinder 24 being discharged into an oil discharge path 30 via the operating valve 28, and the left and right lower links 20 are lowered due to the left and right lift arms 22 being lowered by the lift cylinder 24. When the operating valve 28 is switched to the neutral position "n", the lift cylinder 24 stops extending/retracting due to supply of hydraulic oil to the lift cylinder 24 and discharge of hydraulic oil from the lift cylinder 24 being stopped by the operating valve 28, and the left and right lower links 20 are maintained in a swing position corresponding to the stopped position of the left and right lift arms 22 due to operation of the lift arms 22 being stopped by the lift cylinder 24. In this case, the hydraulic oil from the hydraulic pump 25 is discharged into the discharge channel 30 from the relief oil path 29 by opening a relief valve 29*a* of the relief oil path 29. The hydraulic oil discharged into the discharge channel 30 is returned to the hydraulic oil tank 31 from the discharge channel 30.

Charging and Discharging of Battery

As shown in FIG. 2, the battery 15 has a charging port 32 serving as a charging section connected thereto. As shown in FIG. 1, the charging port 32 is provided on the inner side of a cover 8*a* covering the battery 15 and the like in the motive section 8. The charging port 32 connects the battery 15 and a power source 33 and charges the battery 15 from the power source 33, due to a charging connector 34 that extends from the power source 33 provided outside the vehicle body being connected thereto.

The travel body 3 is provided with a discharge operation apparatus 35 capable of causing the battery 15 to discharge during charging. As shown in FIG. 2, the discharge operation apparatus 35 is provided with a discharge circuit 36 extending between the inverter 16 and the electric motor 26, and a discharge control section 37 linked to the discharge circuit 36.

As shown in FIG. 2, the discharge circuit 36 is provided to extend between the inverter 16 and the electric motor 26, separately from a working motor drive circuit 38 that extends between the inverter 16 and the electric motor 26. The discharge circuit 36 has a discharge switch 36*a*, and when the discharge switch 36*a* is switched to "ON", the battery 15 and the electric motor 26 are connected due to the discharge circuit 36 connecting the inverter 16 and the electric motor 26, and the battery 15 starts discharging. When the battery 15 is discharging, the discharge circuit 36 supplies power from the discharged battery 15 to the electric motor 26 and drives the electric motor 26, due to connecting the battery 15 and the electric motor 26. When the discharge switch 36*a* is switched to "OFF", the battery 15 and the electric motor 26 are disconnected due to the discharge circuit 36 disconnecting the inverter 16 and the electric motor 26, and the battery 15 stops discharging.

As shown in FIG. 2, the discharge control section 37 is provided in a control apparatus 39. The control apparatus 39 is constituted utilizing a microcomputer. The control apparatus 39 is linked to a charging detection mechanism 40 that detects that the battery 15 is charging, a battery temperature detection mechanism 41 that detects the temperature of the battery 15, and an operating valve position detection mechanism 42 that detects that the operating valve 28 is in the neutral position "n".

The charging detection mechanism 40 is provided in the charging port 32, and enters a detection state of detecting that the battery 15 is charging by detecting that the charging connector 34 is connected to the charging port 32, and enters a non-detection state when the charging connector 34 is removed from the charging port 32. The operating valve position detection mechanism 42 is linked to a lift lever 43 that switches the operating valve 28, and, when the operating valve 28 is switched to the neutral position "n", enters a detection state of detecting that the operating valve 28 is in the neutral position "n" based on the operating position of the lift lever 43, and enters a non-detection state when the operating valve 28 is switched to a position other than the neutral position "n", that is, the raising position "a" or the lowering position "b". The control apparatus 39 is provided with a battery temperature setting section 44. The battery temperature setting section 44 sets, as a set battery temperature "SB", the battery temperature of the boundary between a temperature range in which the temperature of the battery 15 needs to be increased and a temperature range in which the temperature of the battery 15 does not need to be increased.

Figure 3:
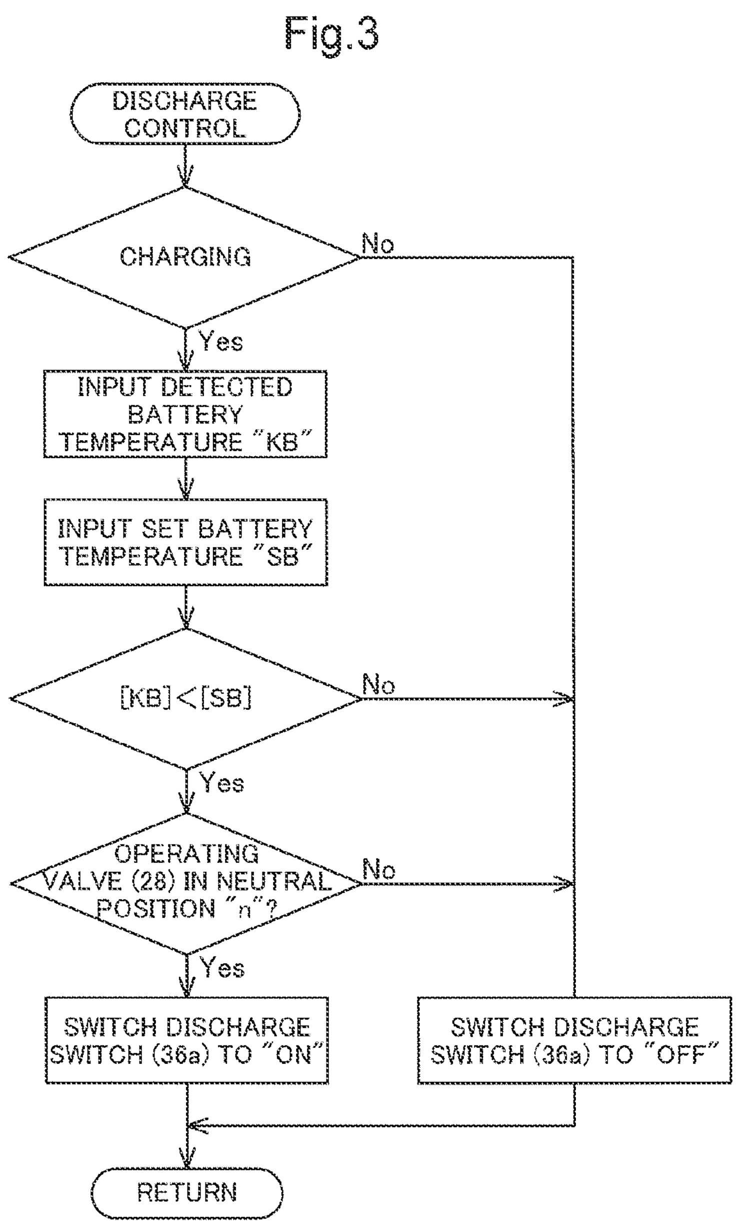
FIG. 3 is a flowchart of discharge control.

As shown in FIG. 3, the discharge control section 37 determines whether or not the battery 15 is charging based on detection information of the charging detection mechanism 40, and, if it is determined that the battery 15 is not charging, switches the discharge switch 36*a* to "OFF". If it is determined that the battery 15 is charging, the discharge control section 37 receives input of a detected battery temperature "KB" detected by the battery temperature detection mechanism 41 and the set battery temperature "SB" set by the battery temperature setting section 44, and compares the detected battery temperature "KB" and the set battery temperature "SB" to determine whether the detected battery temperature "KB" is lower than the set battery temperature "SB". If it is determined that the detected battery temperature "KB" is not lower than the set battery temperature "SB", the discharge control section 37 switches the discharge switch 36*a* to "OFF". If it is determined that the detected battery temperature "KB" is lower than the set battery temperature "SB", the discharge control section 37 determines whether the operating valve 28 is in the neutral position "n" based on detection information of the operating valve position detection mechanism 42. If it is determined that the operating valve 28 is not in the neutral position "n", the discharge control section 37 switches the discharge switch 36*a* to "OFF". If it is determined that the operating valve 28 is in the neutral position "n", the discharge control section 37 switches the discharge switch 36*a* to "ON".

At the time of performing work, the battery 15 is not being charged due to the charging connector 34 not being connected to the charging port 32, and thus the discharge operation apparatus 35 switches the discharge switch 36*a* to "OFF" with the discharge control section 37 based on information that the charging detection mechanism 40 is not in the detection state, and the battery 15 and the electric motor 26 are not connected by the discharge circuit 36. However, at the time of performing work, the operator switches a pump switch 38*a* provided in the motor drive circuit 38 to "ON", resulting the inverter 16 and the electric motor 26 being connected by the motor drive circuit 38, and power from the battery 15 being supplied to the electric motor 26 to drive the electric motor 26, and the hydraulic pump 25 being driven by the electric motor 26 to supply hydraulic oil from the hydraulic pump 25 to the operating oil path 27. At the time of performing work, the lifting cylinder 24 can thereby be controlled by the operating valve 28 and the work apparatus coupled by the link mechanism 13 can be raised and lowered.

When the charging connector 34 is connected to the charging port 32, the battery 15 is charged from the power source 33. When the temperature of the battery 15 is lower than the set battery temperature "SB" and the operating valve 28 is in the neutral position "n" in the case where the battery 15 is charging, the charging detection mechanism 40 is in the detection state and the operating valve position detection mechanism 42 is in the detection state, and, based on the detection information of the charging detection mechanism 40, the detection information of the battery temperature detection mechanism 41, the detection information of the operating valve position detection mechanism 42 and the set battery temperature "SB" of the battery temperature setting section 44, the discharge operation apparatus 35 switches the discharge switch 36*a* to "ON" with the discharge control section 37 and the battery 15 starts discharging, and the battery 15 thereby increases in temperature due to the discharging of the battery 15, and outputs more efficiently than before the increase in temperature. Furthermore, power that is output by the discharged battery 15 is supplied to the electric motor 26 via the inverter 16 and the discharge circuit 36 to drive the electric motor 26, and the hydraulic pump 25 is driven to supply hydraulic oil to the operating oil path 27. The operating valve 28 is in the neutral position "n", and the hydraulic oil supplied to the operating oil path 27 opens the relief valve 29*a* and is discharged from the relief oil path 29, and the hydraulic oil thereby increases in temperature and flows more easily than before the increase in temperature.

Even when the charging detection mechanism 40 detects that the battery 15 is charging, if the temperature of the battery 15 is higher than or equal to the set battery temperature "SB", or the operating valve 28 is not in the neutral position "n", or the temperature of the battery 15 is higher than or equal to the set battery temperature "SB" and the operating valve 28 is not in the neutral position "n", the discharge operation apparatus 35 switches the discharge switch 36*a* to "OFF" with the discharge control section 37 based on the discharge information of the battery temperature detection mechanism 41, the set battery temperature "SB" of the battery temperature setting section 44 and information that the operating valve position detection mechanism 42 is in the non-detection state, and the battery 15 stops discharging.

The battery 15 is charged when work is not being performed. When work is not being performed, the operator switches the pump switch 38*a* to "OFF", and the inverter 16 and the electric motor 26 are not connected by the motor drive circuit 38. Accordingly, when the battery 15 is charging, the discharge state of the battery 15 due to the discharge switch 36*a* being switched "ON" and the non-discharge state of the battery 15 due to the discharge switch 36*a* being switched "OFF" appear.

At the time of performing work, the battery 15 is not charged by the charging port 32, and the inverter 16 and the electric motor 26 are not connected by the discharge circuit 36 due to the discharge switch 36*a* being switched to "OFF", but the operator switches the pump switch 38*a* to "ON", resulting in the inverter 16 and the electric motor 26 being connected by the working motor drive circuit 38. At the time of performing work, the hydraulic pump 25 can be driven due to the electric motor 26 being driven by power from the battery 15.

A configuration may be adopted in which a work clutch that turns power transmission to the power takeoff shaft 14 on and off is provided, the operating state of the work clutch is added to the conditions under which the battery 15 is discharged during charging, with the battery 15 being discharged during charging when the work clutch is disengaged.

Cooling of Inverter

As shown in FIG. 2, the inverter 16 serving as a power device connected to the battery 15 is provided with a cooling apparatus 45, and the cooling apparatus 45 is linked to a cooling control apparatus 55.

As shown in FIG. 2, the cooling apparatus 45 is provided with a cooling apparatus body 46 that is attached to the inverter 16 and cools the inverter 16 through heat exchange with cooling water, a circulation water channel 48 that circulates the cooling water between the cooling apparatus body 46 and a cooling water tank 47, a circulation pump 49 that is provided in the circulation water channel 48 and circulates the cooling water, and an electric cooling motor 50 that drives the circulation pump 49. Between the circulation pump 49 and the cooling apparatus body 46 in the circulation water channel 48 is provided a cooling water cooler 51.

As shown in FIG. 2, the cooling control apparatus 55 is provided with a motor drive circuit 56 extending between electric cooling motor 50 and the inverter 16, and a cooling control section 57 provided in the control apparatus 39.

As shown in FIG. 2, the motor drive circuit 56 has a cooling switch 56*a*, and, when the cooling switch 56*a* is switched to "ON", is switched to an operating state of connecting the inverter 16 and the electric cooling motor 50 to supply power from the battery 15 to the electric cooling motor 50, and driving the electric cooling motor 50 to operate the cooling apparatus 45. When the cooling switch 56*a* is switched to "OFF", the motor drive circuit 56 is switched to a stopped state in which power supply from the battery 15 to the electric cooling motor 50 is stopped due to the inverter 16 and the electric cooling motor 50 being disconnected, and the cooling apparatus 45 is stopped due to the electric cooling motor 50 being stopped.

As shown in FIG. 2, the control apparatus 39 is linked to an inverter temperature detection mechanism 58 serving as a device temperature detection mechanism. The control apparatus 39 is provided with an inverter temperature setting section 59 serving as a device temperature setting section. The inverter temperature setting section 59 sets a set inverter temperature "SI" serving as the device setting temperature. As the setting inverter temperature "SI", the inverter temperature of the boundary between a temperature range in which the inverter 16 needs to be cooled and a temperature range in which the inverter 16 does not need to be cooled is set.

Figure 4:
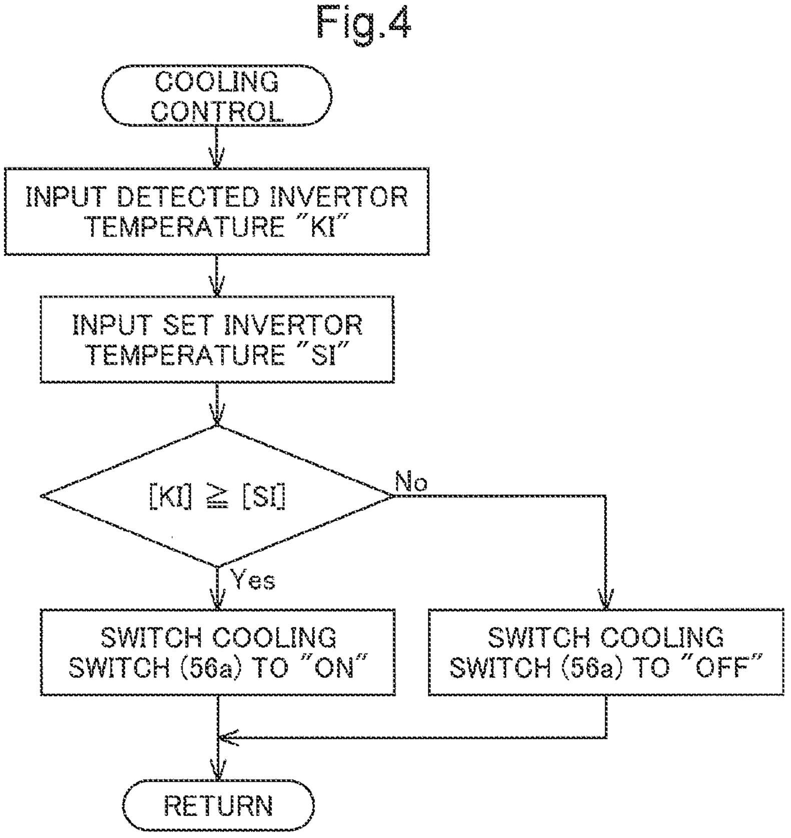
FIG. 4 is a flowchart of cooling control.

As shown in FIG. 4, the cooling control section 57 inputs a detected inverter temperature "KI" of the inverter temperature detection mechanism 58 and the setting inverter temperature "SI" set by the inverter temperature setting section 59, and determines whether the detected inverter temperature "KI" is higher than or equal to the set inverter temperature "SI" through comparison the detected inverter temperature "KI" and the set inverter temperature "SI". If it is determined that the detected inverter temperature “KI” is not higher than or equal to the set inverter temperature “SI”, the cooling control section 57 switches the cooling switch 56*a* to “OFF”. If it is determined that the detected inverter temperature “KI” is higher than or equal to the set inverter temperature “SI”, the cooling control section 57 switches the cooling switch 56*a* to “ON”.

When the temperature of the inverter 16 increases to higher than or equal to the set inverter temperature “SI”, the cooling control apparatus 55 switches the cooling switch 56*a* to “ON” with the cooling control section 57 based on detection information of the inverter temperature detection mechanism 58 and the set inverter temperature “SI” set by the inverter temperature setting section 59, drives the electric cooling motor 50 to operates the cooling apparatus 45, and cooling of the inverter 16 by the cooling apparatus 45 is performed.

When the temperature of the inverter 16 falls below the set inverter temperature “SI”, in cases such as where the inverter 16 is cooled by the cooling apparatus 45, the cooling control apparatus 55 switches the cooling switch 56*a* to “OFF” with the cooling control section 57 based on detection information of the inverter temperature detection mechanism 58 and the set inverter temperature “SI” of the inverter temperature setting section 59, and stops the cooling apparatus 45 by stopping the electric cooling motor 50, and cooling by the cooling apparatus 45 of the inverter 16 is stopped.

As shown in FIG. 2, the battery 15 is provided with a battery cooling apparatus 60. As work proceeds, the discharge time of the battery 15 increases and the temperature of the battery 15 rises. In this case, cooling the battery 15 with the battery cooling apparatus 60 is possible.

As shown in FIG. 2, the battery cooling apparatus 60 is provided in the battery 15 and has a cooling section 61 that cools the battery 15 with cooling water as a coolant, and a circulation water channel 63 that circulates the cooling water with a circulation pump 62 between the cooling section 61 and a cooling water tank 47. The circulation pump 62 is driven by an electric motor 64. A cooling control apparatus can be employed in which an electric motor 70 is driven to drive a circulation pump 68, when the temperature of the electric motor 26 exceeds a set temperature. A cooling control apparatus can be employed in which the electric motor 64 is driven to drive the circulation pump 62 when the temperature of the battery 15 increases to a set cooling start temperature, and the electric motor 64 is stopped to stop the circulation pump 62 when the temperature of the battery 15 drops to the set cooling stop temperature.

As shown in FIG. 2, the electric motor 26 serving as an electric device connected to the battery 15 is provided with a device cooling apparatus 66. As the work progresses, the driving time of the electric motor 26 increases and the temperature of the electric motor 26 rises. In this case, seizure of the electric motor 26 can be avoided by cooling the electric motor 26 with the device cooling apparatus 66.

The device cooling apparatus 66 is provided in the electric motor 26, and has a cooling water jacket 67 that cools the electric motor 26 with cooling water serving as a coolant, and a circulation water channel 69 that circulates cooling water between the cooling water jacket 67 and the cooling water tank 47 with the circulation pump 68. The circulation pump 68 is driven by an electric motor 70. A cooling control apparatus can be employed in which the electric motor 70 is driven to drive the circulation pump 68, when the temperature of the electric motor 26 rises to higher than or equal to the set temperature.

Other Embodiments (1) The above-described embodiment gives an example in which the charging detection mechanism 40 and the discharge control section 37 are provided, and the discharge operation apparatus 35 automatically causes the battery 15 to discharge during charging, but the invention is not limited thereto, and the discharge operation apparatus 35 may not be provided with the charging detection mechanism 40 and the discharge control section 37, and the battery 15 may be discharged as a result of the operator operating the discharge operation apparatus during charging of the battery 15.

(2) The above-described embodiment gives an example in which the operating valve 28 being in the neutral position “n” is a condition for causing the battery 15 to discharge, but the operating position of the operating valve need not be a condition.

(3) The above-described embodiment gives an example in which the cooling apparatus 45 and the cooling control apparatus 55 are provided, but the cooling apparatus 45 and the cooling control apparatus 55 need not be provided.

(4) The above-described embodiment gives an example in which an inverter is employed as a power device, but the invention is not limited thereto, and a transformer, a DCDC converter or the like may be employed as the power device.

(5) The above-described embodiment gives an example in which an electric motor is employed as an electric device, but the invention is not limited thereto, and an electric cylinder or the like may be employed as the electric device.

(6) The above-described embodiment gives an example in which the battery cooling apparatus 60 and the device cooling apparatus 66 are provided, but the battery cooling apparatus 60 and the device cooling apparatus 66 need not be provided.

(7) The above-described embodiment gives an example in which the electric motor 26 and the hydraulic pump 25 that are driven by power from the battery 15 while the battery 15 is discharging are provided, but the electric motor 26 and the hydraulic pump 25 need not be provided, and the discharging battery 15 may simply discharge.

(8) The invention can be applied to a work vehicle provided with a battery that supplies drive power to an electric actuator and a charging section for charging the battery from a power source outside the vehicle body.

What is claimed is:

1. A work vehicle comprising:

an electric actuator;

a battery configured to supply drive power to the electric actuator;

a charging section via which the battery is chargeable from a power source external to a vehicle body;

a discharge operation apparatus configured to cause the battery to discharge during charging of the battery;

a hydraulic pump connected to a hydraulic actuator via an operating oil path and configured to supply hydraulic oil to the hydraulic actuator;

an operating valve provided in the operating oil path and configured to control the hydraulic actuator;

an electric motor configured to drive the hydraulic pump;

an operating valve position detection mechanism configured to detect that the operating valve is in a neutral position for stopping the hydraulic actuator;

a power device connected to the battery; and a discharge circuit extending between the battery and the power device, wherein the discharge circuit includes a discharge switch capable of switching between a connected state and a disconnected state between the battery and the power device, and wherein the discharge operation apparatus causes the battery to discharge by connecting the battery to the electric motor such that power is supplied to the electric motor from the battery when the operating valve is in a neutral position for stopping the hydraulic actuator.

2. The work vehicle according to claim 1, further comprising:

a charging detection mechanism configured to detect charging of the battery, and wherein the discharge operation apparatus comprises a discharge control section configured to cause the battery to discharge during charging, based on detection information of the charging detection mechanism.

3. The work vehicle according to claim 2, further comprising:

a battery temperature detection mechanism configured to detect a temperature of the battery, and wherein the discharge control section causes the battery to discharge during charging, in response to a battery temperature detected by the battery temperature detection mechanism being lower than a set battery temperature, and does not cause the battery to discharge during charging, in response to the detected battery temperature being higher than or equal to the set battery temperature.

4. The work vehicle according to claim 1, further comprising:

a cooling apparatus configured to cool the power device;

a device temperature detection mechanism configured to detect a temperature of the power device; and a cooling control apparatus configured to control operation of the cooling apparatus based on detection information of the device temperature detection mechanism, and wherein the cooling control apparatus controls the cooling apparatus to operate, in response to a device temperature detected by the device temperature detection mechanism being higher than or equal to a set device temperature, and controls the cooling apparatus to stop operation, in response to the detected device temperature being lower than the set device temperature.

5. The work vehicle according to claim 1, wherein the power device is an inverter.

6. The work vehicle according to claim 1, further comprising:

an electric device connected to the battery; and a device cooling apparatus configured to cool the electric device.

7. The work vehicle according to claim 1, further comprising:

a battery cooling apparatus configured to cool the battery.

* * * * *